(12) United States Patent
Schreck

(10) Patent No.: US 7,136,889 B1
(45) Date of Patent: Nov. 14, 2006

(54) METHOD AND APPARATUS FOR GENERATING HIGH QUALITY REAL RANDOM NUMBERS USING A DISK DRIVE

(75) Inventor: Erhard Schreck, San Jose, CA (US)

(73) Assignee: Maxtor Corporation, Longmont, CO (US)

(*) Notice: Subject to any disclaimer, the term of this patent is extended or adjusted under 35 U.S.C. 154(b) by 331 days.

(21) Appl. No.: 09/649,659

(22) Filed: Aug. 29, 2000

(51) Int. Cl.
*G06F 1/02* (2006.01)

(52) U.S. Cl. ...................... 708/250; 708/255

(58) Field of Classification Search ............. 708/250, 708/253, 254, 255, 256
See application file for complete search history.

(56) References Cited

U.S. PATENT DOCUMENTS

| | | | |
|---|---|---|---|
| 4,713,787 A * | 12/1987 | Rapp | 708/250 |
| 4,949,322 A * | 8/1990 | Kimura et al. | 369/32 |
| 4,987,502 A | 1/1991 | Freeze | |
| 6,014,746 A | 1/2000 | Krehnke et al. | |
| 6,014,768 A | 1/2000 | Lee et al. | |
| 6,049,442 A | 4/2000 | Fukushima et al. | |
| 6,076,097 A | 6/2000 | London et al. | |
| 6,091,564 A | 7/2000 | Codilian et al. | |
| 6,272,223 B1 | 8/2001 | Carlson | |
| 6,468,160 B1 * | 10/2002 | Eliott | 463/43 |
| 6,502,116 B1 * | 12/2002 | Kelly et al. | 708/250 |
| 6,599,194 B1 | 7/2003 | Smith et al. | |
| 6,636,372 B1 | 10/2003 | Nguyen et al. | |

OTHER PUBLICATIONS

Davis, Don, et al., "Cryptographic Randomness from Air Turbulence in Disk Drives", *Advances in Cryptology-Crypto '94*, pp. 114-120 (1994).
Zimmerman, Philip R.; "Cryptography for the Internet"; *Scientific American*; Oct. 1998; pp. 110-115.

* cited by examiner

*Primary Examiner*—Chuong D. Ngo
(74) *Attorney, Agent, or Firm*—Tejpal S. Hansra

(57) ABSTRACT

A method and apparatus for generating high quality real random numbers is provided. In particular, the present invention enables a hard disk drive of a computer to function as a generator of high quality real random numbers by monitoring one or more of a disk drive's parameters, wherein such parameters are subjected to environmental effects. The system of the present invention does not require the addition of any hardware not normally associated with a computer. According to one embodiment of the present invention, a parameter of the disk drive is monitored, and after processing and filtering the parameter is provided to an application as a random number. Monitored parameters may include the position error signal of a transducer head with respect to a track, temperature, channel gain, transducer head flying height, etc. According to one embodiment of the present invention, the various other parameters may be combined or used in concert to provide high quality real random numbers.

210 Claims, 8 Drawing Sheets

METHOD AND APPARATUS FOR GENERATING HIGH QUALITY REAL RANDOM NUMBERS USING A DISK DRIVE

FIELD OF THE INVENTION

The present invention relates to the generation of random numbers. In particular, the present invention relates to the use of environmental parameters observed in a disk drive for generating perfect random numbers.

BACKGROUND OF THE INVENTION

The generation of perfect random numbers is increasingly important in computer applications. For instance, random numbers are used in connection with computer simulations of real world events, and in connection with encryption techniques. In particular, the increased need for the encryption of sensitive data has led to the need for long strings of high quality real random numbers, preferably generated within a short period of time.

At present, methods for the generation of pseudo-random numbers are available. Pseudo-random number generators generally must be provided with a random "seed" number. The pseudo-random number generator then applies the seed to an algorithm to create a series of numbers. The seed may be obtained from various inputs. For instance, the random seed may be derived from the time interval between user keystrokes on a computer keyboard. However, the series of numbers provided by a pseudo-random number generator is deterministic, and therefore predictable. In addition, the same series of numbers is generated if the same seed is used. Therefore, pseudo-random number generators are not ideal for use in connection with applications requiring or benefiting from the use of high quality real random numbers.

A perfect or real random number is a number selected from a set of numbers such that each number in the set has the same probability of being selected. Furthermore, a random number is unpredictable. Real random numbers may be derived from environmental noise. The generation of random numbers from environmental noise necessarily requires an interface with the environment. At present, random number generators, in the form of specialized hardware that convert environmental noise, such as noise from electrical or radioactive sources, to a digital signal and that can be interconnected to a computer, are available. However, the use of such hardware entails additional costs to the computer user, as the specialized hardware is not normally provided as part of a computer. In addition, such hardware requires an interface with the computer. Random number generators associated with certain computer processors are also available. For example, certain INTEL processors include an integrated random number generator. Such random number generators are believed to be capable of providing random bits at a rate of about 75 kbits/s. However, such processor-based random number generators are not widely available, and they typically require the provision of additional circuitry in the processor that is dedicated to the generation of random numbers.

Other methods for generating random numbers include measuring the time between key strokes entered by the user of a computer or the time required for the user of a computer to move a mouse from one position to another. The use of variations in the rotational velocity of a computer disk drive has also been proposed. However, such methods provide too low a rate of random number generation to be useful in connection with applications requiring long strings of random bits. For instance, the use of variations in the rotational speed of a disk drive, believed to be the fastest of these methods, produces only about 100 random bits per minute.

One application that benefits from long strings of random bits are encryption programs. The use of encryption programs to protect sensitive information is increasingly widespread, as computers are often used to store or transfer such information. In order to safeguard sensitive information from unauthorized access, various encryption techniques have been devised. In order to limit the ability of a cryptoanalyst, or hacker, to discern a pattern or deduce a key used to encrypt a particular set of data, real random numbers are necessary.

The encryption of computer data usually involves the "scrambling" of data using an algorithm and a key that is unique to the person or entity seeking to encrypt the data. The key, which is required to unencrypt the data, may be as many as several thousand bits long. However, to even encrypted data is vulnerable to unauthorized access, particularly where the algorithm or key used to encrypt the data can be narrowed down by a hacker, or cryptoanalyst, to a reduced number of possible keys. If a key can be chosen that is truly random, deducing the key will be much more difficult, as a hacker will be unable to discern a pattern to assist in the recreation of the key.

Other computer applications that can benefit from the use of real random numbers are games and simulations (like Monte Carlo algorithms) of natural phenomena. The use of real random numbers in connection with such applications aids in ensuring that the results obtained are free from any unintentional bias that may skew the results. Therefore, real random numbers can make games more enjoyable and less predictable, and can increase the usefulness of computer simulations.

It would be advantageous to provide a random number generator that produces a relatively large number of high quality real random numbers in a short period of time. In addition, it would be advantageous to provide a generator of high quality real random numbers that did not require the provision of hardware not normally included as part of a computer. Furthermore, it would be advantageous to provide a generator of high quality real random numbers that added little to the cost of a computer and that was reliable in operation.

SUMMARY OF THE INVENTION

In accordance with the present invention, a method and apparatus for generating high quality real random numbers is provided. The present invention allows a hard disk drive conventionally provided as part of a computer to function as a generator of high quality real random numbers. In particular, according to the present invention, parameters of the hard disk drive that are influenced or controlled by environmental, and thus truly random, phenomena are monitored to provide high quality real random numbers.

In accordance with one embodiment of the present invention, the position error of a transducer head with respect to a track being followed is monitored. This value may be provided as a high quality real random number. According to a further embodiment of the present invention, the position error signals derived from a group of servo sector position bursts are mixed together to provide a high quality real random number. According to yet another embodiment of the present invention, the mixed values are filtered before being provided as a high quality real random number to an application.

The present invention may be implemented using firmware running on the disk drive controller. High quality real random numbers may be generated in response to a request from an application running on a host computer, or may be generated by the disk drive when the disk drive is otherwise idle. High quality real random numbers may be stored on the disk drive itself for later use by the host computer, so as to provide high quality real random numbers to an application program with a minimum of delay and at a higher bandwidth than originally generated.

Based on the foregoing summary, a number of salient features of the present invention are readily discerned. A method and apparatus for providing high quality real random numbers are provided. The method and apparatus of the present invention provide high quality real random numbers at a high rate, allowing the invention to be used in connection with applications requiring a relatively large number of high quality real random numbers, with little or no delay apparent to the user. In addition, the method and apparatus of the present invention allow the generation of high quality real random numbers using a standard computer, without requiring hardware not normally associated with such a computer.

Additional advantages of the present invention will become readily apparent from the following discussion, particularly when taken together with the accompanying drawings.

DETAILED DESCRIPTION OF THE PRESENT INVENTION

Figure 1:
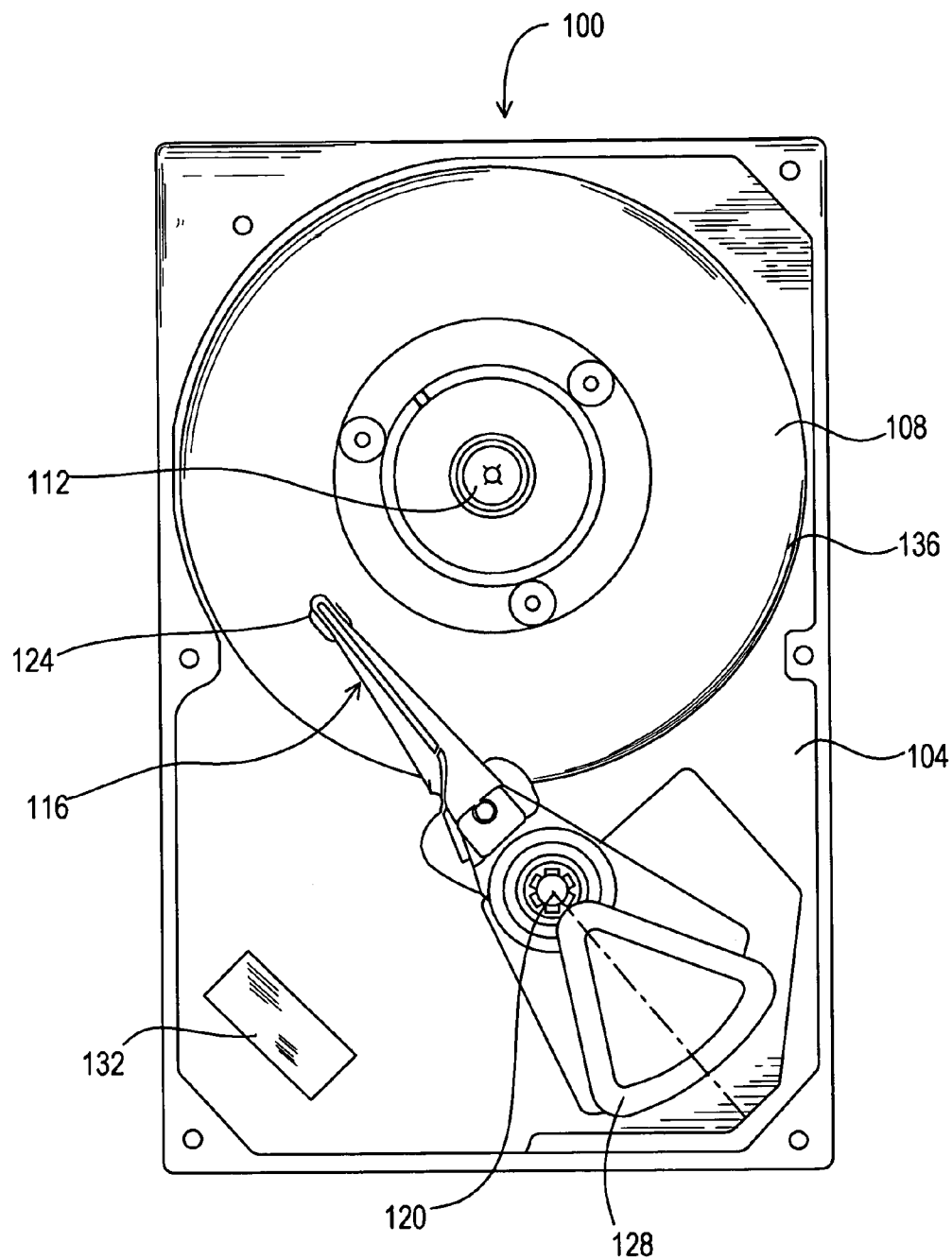
FIG. 1 is a diagrammatic representation of a top view of a conventional computer disk drive, with the cover removed.

FIG. 1 illustrates a typical computer disk drive 100. The disk drive 100 generally includes a base 104 and magnetic disks 108 (only one of which is shown in FIG. 1). The magnetic disks 108 are interconnected to the base 104 by a spindle motor (not shown) mounted within or beneath the hub 112, such that the disks 108 can be rotated relative to the base 104. Actuator arm assemblies 116 (only one of which is shown in FIG. 1) are interconnected to the base 104 by a bearing 120. The actuator arm assemblies 116 each include a transducer head 124 at a first end, to address each of the surfaces of the magnetic disks 108. A voice coil motor 128 pivots the actuator arm assemblies 116 about the bearing 120 to radially position the transducer heads 124 with respect to the magnetic disks 108. The voice coil motor 128 is operated by a controller 132 that is in turn operatively connected to a host computer (not shown). By changing the radial position of the transducer heads 124 with respect to the magnetic disks 108, the transducer heads 124 can access different data tracks or cylinders 136 on the magnetic disks 108.

Figure 2:
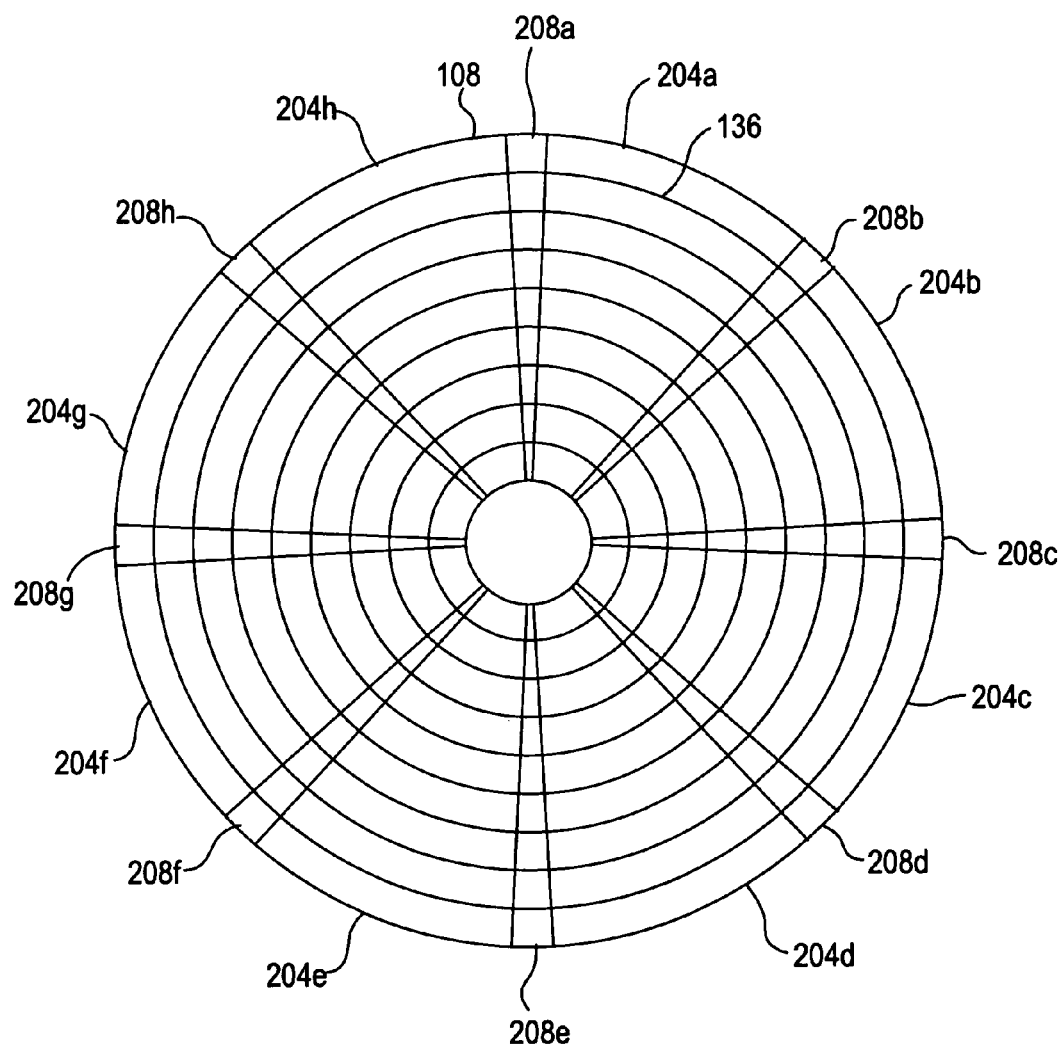
FIG. 2 is a diagrammatic representation of a magnetic storage disk.

With reference now to FIG. 2, a typical arrangement of data tracks 136 on a magnetic disk 108 is illustrated. Usually, the data tracks 136 are divided into data fields 204a–204h with a servo sector 208a–208h between each data field 204a–204h. Generally, the data fields 204a–204h are used for storing data as a series of magnetic transitions, while the servo sectors 208a–208h are used for storing information used to provide the transducer head 124 with positioning information, also as a series of magnetic transitions. In particular, the servo sectors 208a–208h provide the transducer head 124 with information concerning its position over the magnetic disk 108. More particularly, the servo sectors 208a–208h may provide information to the transducer head 124 concerning the position of the transducer head 124 with respect to the centerline, or a position offset from the centerline, of a track 136.

Although the magnetic disk 108 shown in FIGS. 1 and 2 is illustrated as having a relatively small number of data tracks and sectors, it can be appreciated that a typical computer disk drive contains a very large number of data tracks and sectors. For example, computer disk drives having over 14,000 tracks per inch and 240 sectors are presently available. In addition, alternative configurations of magnetic disks 108 are possible. For example, in a computer disk drive having several magnetic disks 108, a surface of one of the disks 108 may be dedicated to servo information, while other surfaces of the remaining disks 108 may be used exclusively to store data.

As the transducer head 124 in a disk drive 100 reads data from or writes data to the disk 108, its position with respect to the centerline of the data track 136 being followed typically varies. This variation, or "noise," may be due, at least in part, to environmental factors, such as temperature, humidity, pressure and vibration. Accordingly, the position of the transducer head 124 with respect to a data track 136 is, at least in part, due to random effects. Therefore, by monitoring the position of a transducer head 124 with respect to a track 136 being followed, high quality real random numbers can be generated.

Figure 3:
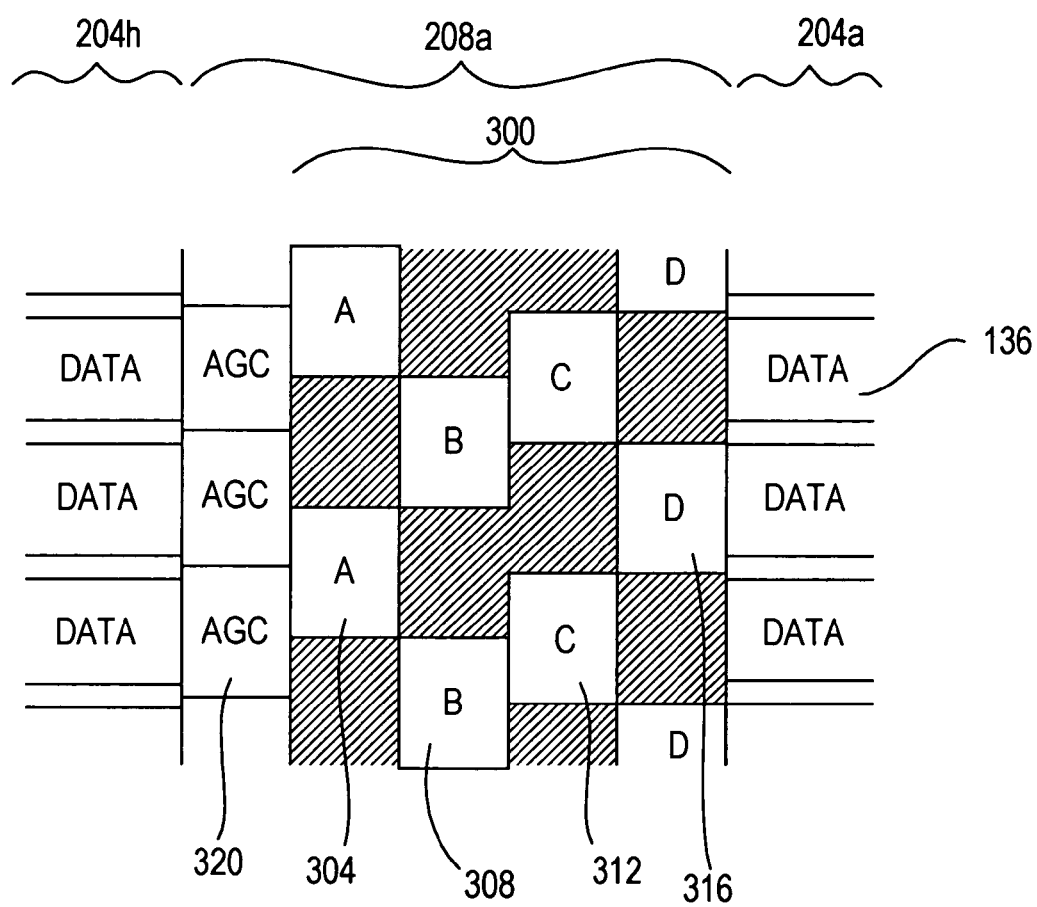
FIG. 3 is a diagrammatic representation of an arrangement of information on a conventional magnetic storage disk wherein the information is used in one embodiment of the present invention.

In a typical disk drive 100, position information is provided by servo sector position bursts 300, also known as servo bursts, associated with each data track 136, and located within the servo sectors 208 (see FIG. 3). The servo sector position bursts 300 may include A 304, B 308, C 312 and D 316 position bursts. In addition to the servo sector position bursts 300, each servo sector 208 may include a series of automatic gain control fields 320. The automatic gain control fields 320 may be used to adjust the gain imparted to signals derived from the magnetic transitions on the disk 108. Of course, alternate configurations of information stored in the servo sectors 208 may also be used. For example, different patterns of A 304, B 308, C 312 and D 316 position bursts may be used. In addition, fewer position bursts may be provided. For example, only A 304 and B 308 position bursts may be provided.

Figure 4:
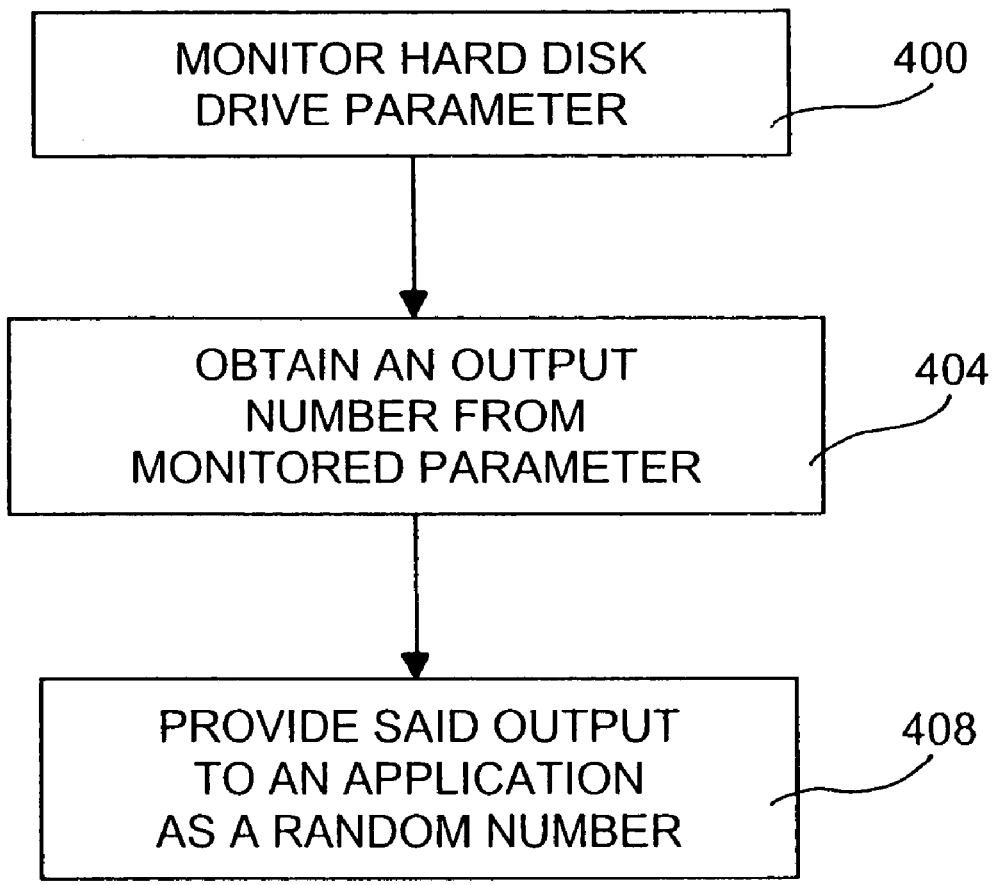
FIG. 4 is a flowchart of the operation of a system according to an embodiment of the present invention.

With reference now to FIG. 4, a flowchart of the operation of a system constructed in accordance with an embodiment of the present invention is shown. Initially, at step 400, a disk drive parameter is monitored. In general, all signals processed in a disk drive 100 contain noise. For instance, electronic noise is introduced by the preamplifier and read element, while magnetic noise results from variations in the magnetic media and from spacing variations between the read element and the magnetic film. The monitored disk drive parameter may include any parameter of the disk drive having an associated signal containing noise that is subject to variation due to environmental conditions. For instance, monitored parameters may include the position error of the transducer head 124 with respect to a particular track 136, the flying height of the transducer head 124 over the surface of the magnetic disk 108, the amount of gain imparted to signals by the disk drive, the temperature of the drive, changes in the amplitude of signals derived from magnetic transitions written to the disk 108, the quality monitor of the digital channel, where the quality monitor represents the error between the detected magnetic signal and the expected signal, or any signal in the disk drive 100 subject to changes due to environmental effects.

At step 404, an output number is obtained from the monitored parameter. The output number may be simply a numerical representation of the observed parameter, or may be a number otherwise derived from the observed parameter, as will be described in more detail below. The output number may then be provided to an application running on a computer to associated with the computer disk drive 100 as a high quality real random number (step 408).

Figure 5:
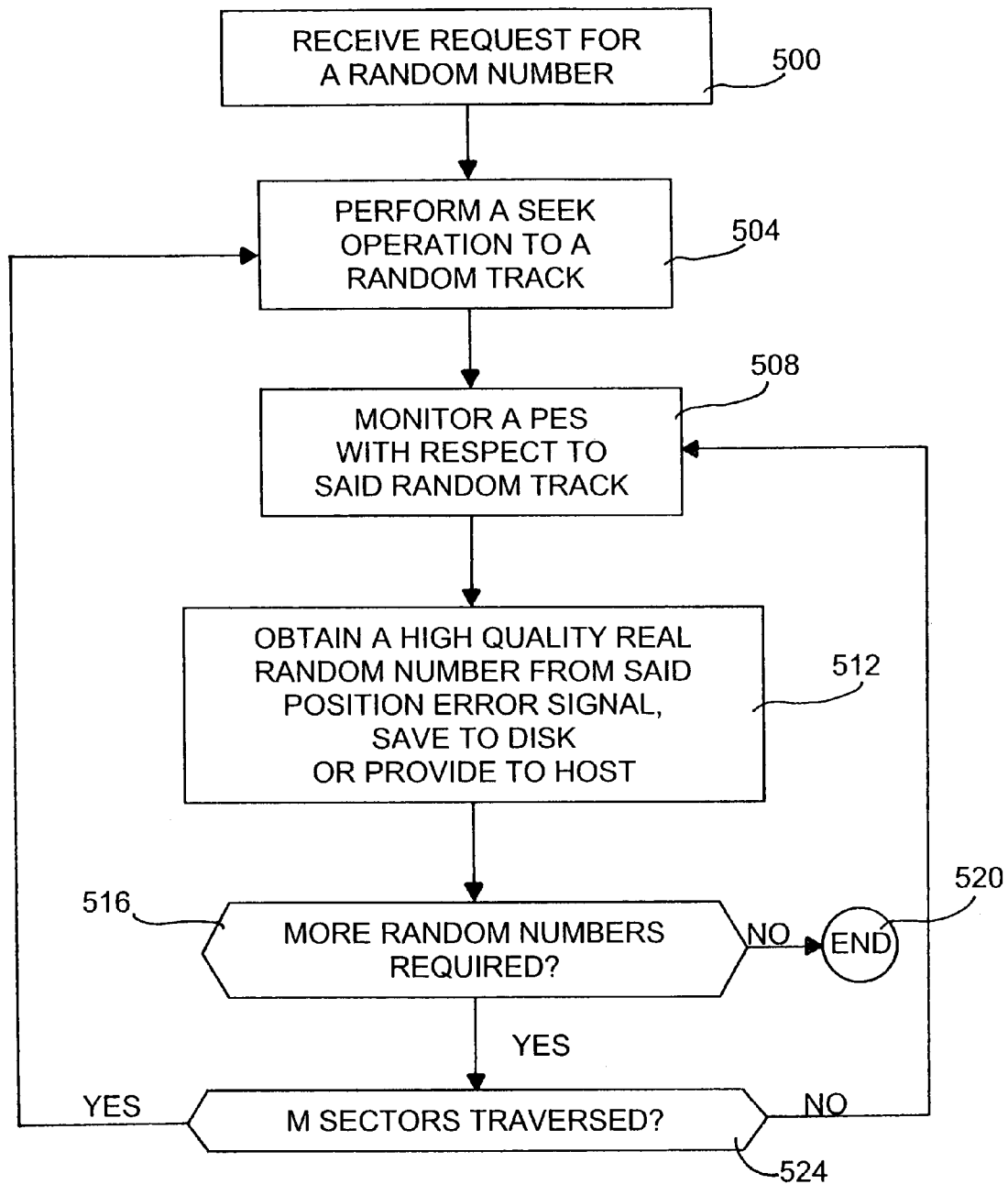
FIG. 5 is a flowchart illustrating the production of high quality real random numbers in accordance with an embodiment of the present invention.

With reference now to FIG. 5, a method for generating high quality real random numbers according to an embodiment of the present invention is illustrated. Initially, at step 500, a request for a random number is received by the disk drive. Typically, such a request will be received when an application running on a host computer associated with the disk drive 100 requires a random number. For example, the host computer may be running an encryption program that requires a certain number of bits as an encryption key. For instance, the program may require 128 preferably high quality real random bits. Alternatively, the application may be a simulation of natural phenomena or a game that requires a random value for its operation. In addition, the hard disk drive 100 may generate the request for a random number itself. For instance, the disk drive 100 may generate a series of such requests and store the resulting high quality real random numbers to the disk 108 itself to provide a store of high quality real random numbers for use by an application at a later time.

According to the embodiment of the present invention illustrated in FIG. 5, in response to the request for a random number, the disk drive 100 performs a seek operation (step 504). Generally, in a computer disk drive, a seek operation consists of the movement of the actuator arm assembly 116 such that the transducer head 124 is moved from a position over a first track 136 to a position over a second track 136. It should be noted that, for the proper operation of the invention, it is not necessary that the track 136 to which the seek operation is made be selected at random. For instance, the track 136 may be selected sequentially or pseudo-randomly using techniques that are well-known to those skilled in the art. Once the transducer head 124 has traveled to a position over the selected track 136, the position error signal of the transducer head 124 with respect to the track 136 is monitored (step 508). In general, a position error signal is generated as the transducer head 124 passes over each servo sector 208. In particular, the position error signal is generated by the A 304, B 308, C 312 and D 316 servo sector position bursts located in each servo sector 208. At step 512, a high quality real random number is obtained from the position error signal, and that number is saved to the disk 108 or is provided to the host computer for immediate use or to be stored in memory for later use (step 512). Alternatively or in addition, additional disk drive parameters may be monitored and used as a source of high quality real random numbers. The additional parameters may also be used to provide high quality real random numbers following a seek operation. However, it is not required by the present invention that a seek operation be performed prior to obtaining random numbers from the position error signal or other disk drive parameters.

At step 516, the system illustrated in FIG. 5 determines whether more random numbers are required. If no more random numbers are required, the procedure ends (step 520). If further random numbers are required, the system at step 524 determines the number of servo sectors 208 traversed by the transducer head 124 since the transducer head 124 began following the present track 136. Generally, if the number of sectors traversed is less than a value M, the system returns to step 508, and the position error signal generated by the next servo sector 208 to pass beneath the transducer head 124 is monitored. If M sectors have been traversed, the system returns to step 504, and a seek operation to an Nth track is performed, where the Nth track is the next track in a sequence or is randomly or pseudo-randomly selected. Generally, the value M is selected to be less than the total number of sectors 208 associated with a particular track 136. For instance, in a disk drive 100 having 240 sectors per track, M would be a value of less than 240. For instance, M may be equal to 100. The value M may itself be randomly or pseudo-randomly determined, although it is preferable that the value be less than the total number of sectors 208 associated with the track 136 being followed to avoid the non-random effects of repeatable runout. An additional value, called the offset O, can be randomly selected. This value O determines the start from where the M sectors are traversed. It should be noted that, according to alternative embodiments of the present invention, it is not necessary to limit the number of sectors in a track from which random numbers are derived.

Repeatable runout may be due to manufacturing defects, disk imbalances or tolerances associated with the bearings used to interconnect the disks 108 to the base 104 of the disk drive 100. Tracks 136 that are not written to the disks 108 during the manufacturing process such that they are perfectly concentric about the axis of rotation of the disks 108 are another source of repeatable runout. Repeatable runout manifests itself as a change in the distance of a track 136 from the center or axis of rotation of the disk 108 that repeatedly occurs with each revolution of the disk 108 with respect to the transducer head 124.

Figure 6:
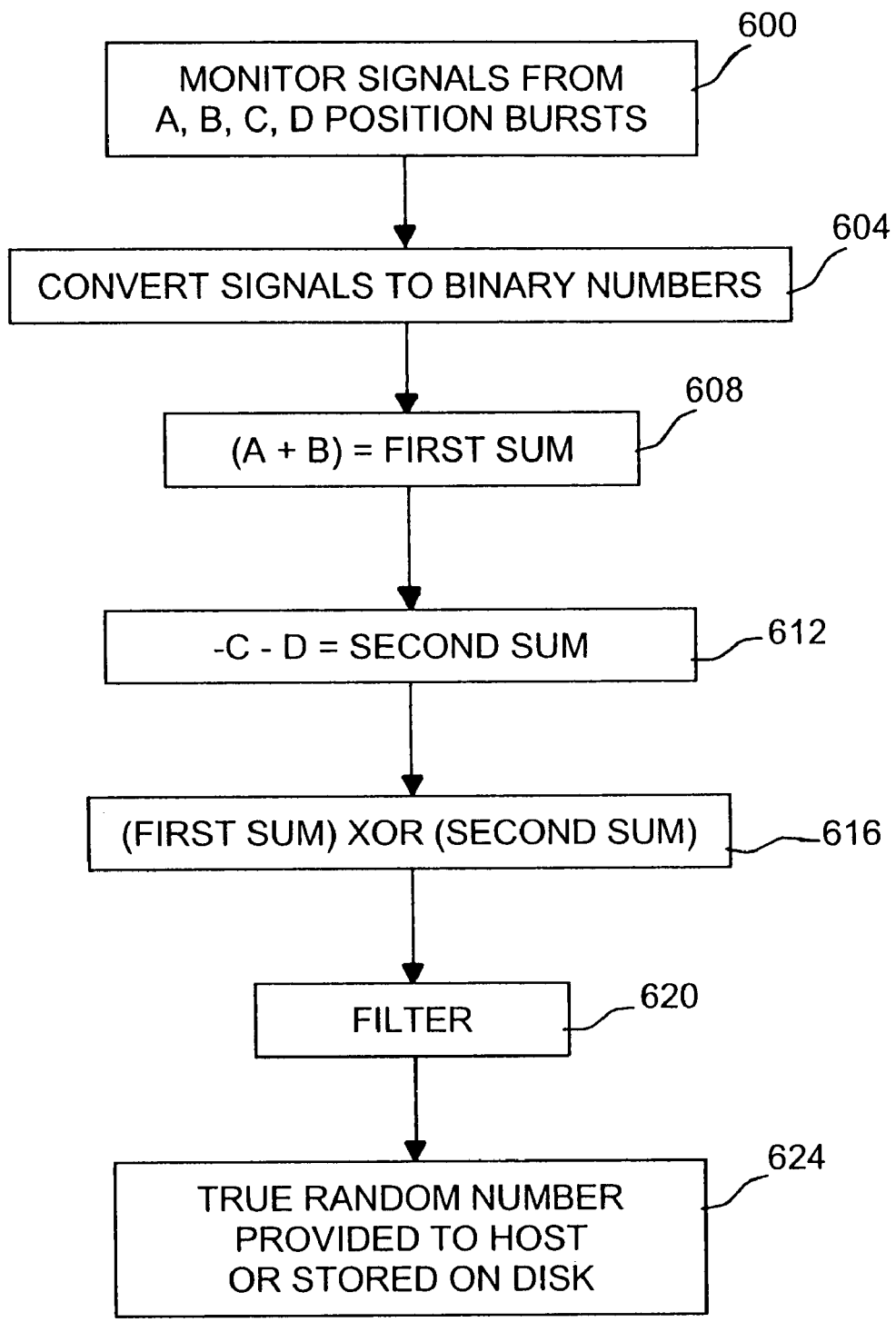
FIG. 6 is a flowchart illustrating aspects of the production of high quality real random numbers according to an embodiment of the present invention.

With reference now to FIG. 6, the steps taken to obtain a high quality real random number in accordance with an embodiment of the present invention are illustrated. Initially, at step 600, position error signals derived from the A 304, B 308, C 312 and D 316 position bursts are monitored. At step 604, the monitored signals are converted to binary numbers. The numbers derived from the A 304 and B 308 position bursts are added to obtain a first sum (step 608). The negatives of the values derived from the C 312 and D 316 position bursts are added together at step 612 to obtain a second sum. At step 616, an Exclusive Or (XOR) operation is performed using the first and second sums, in the form of binary numbers. The value obtained after performing the Exclusive Or operation is filtered (step 620) and the resulting high quality real random number is provided to the host computer or is stored to the disk (step 624).

It should be appreciated that the calculation of first and second sums and the performance of the Exclusive Or operation on the values thus obtained is not necessary to the present invention. However, some mixing of the values obtained from the position bursts 300 is believed to be beneficial to the generation of high quality real random numbers. The use of mixing functions, including applying the Exclusive Or function to binary values, generally involves the combination of two or more inputs to produce an output which has a complex, non-linear relationship to the input bits. In general, such mixing functions are believed to produce a new sequence that is more random than the input sequences alone.

Figure 7:
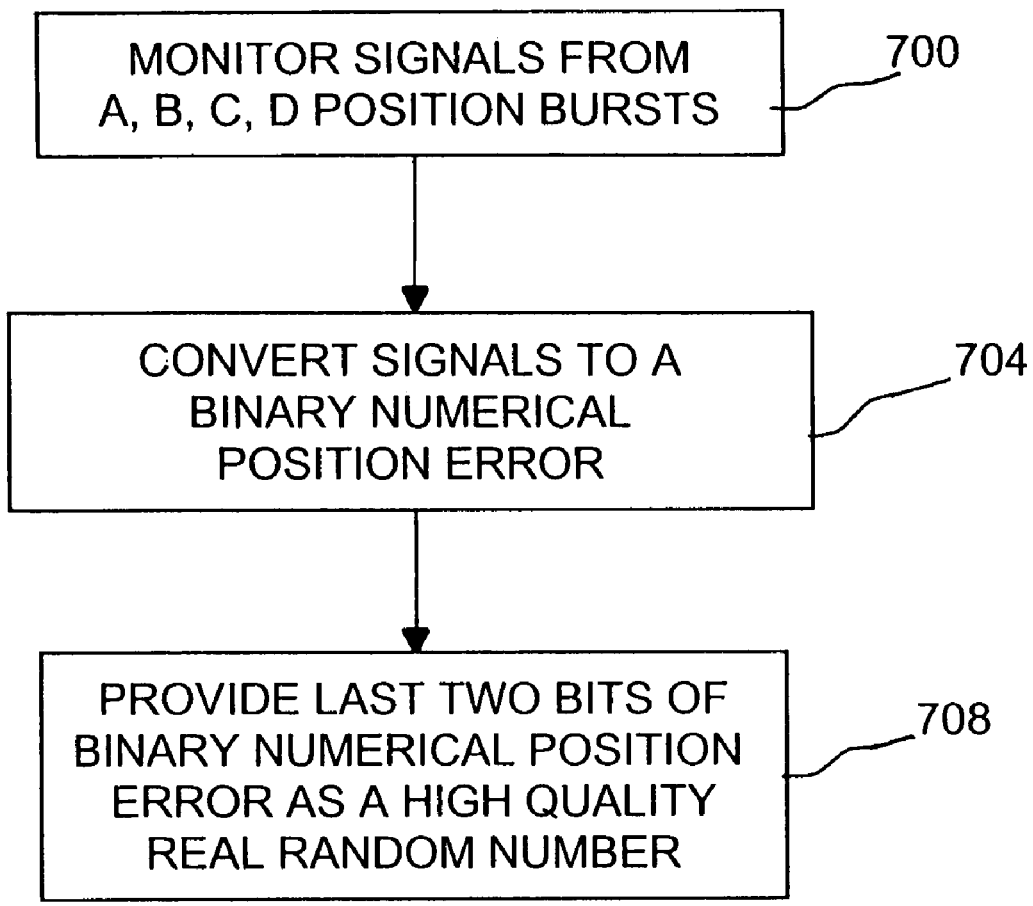
FIG. 7 is a flowchart illustrating aspects of the production of high quality real random numbers according to another embodiment of the present invention.

With reference now to FIG. 7, the steps taken to obtain a high quality real random number in accordance with another embodiment of the present invention are illustrated. Initially, at step 700, position error signals derived from the A 304, B 308, C 312 and D 316 position bursts are monitored. At step 704, the monitored signals are converted to a numerical position error. The two least significant digits or bits of the numerical error may then be provided as a high quality real random number (step 708). Where more than two random digits or bits are required, or an increase in the bandwidth of the random number generator is desired, more than the two least significant digits or bits may be utilized as part of a high quality real random number. For instance, the last four bits of a binary position error may be used. In general, higher quality real random numbers can be generated if more significant digits are not used. In addition, where long strings of random bits are required by an application, the process of monitoring a position error signal of a transducer head, converting that signal to a numerical value and taking the least significant digits or bits may be repeated, and the least significant digits or bits may be appended to random digits or bits previously generated.

As yet a further method for producing strings of random digits and increasing the bandwidth of the random number generator, the random digits obtained from the position error signal may be combined with the mean square error of the channel, or with digits or bits obtained from any other randomly influenced disk drive parameter. For instance, the eight least significant bits of the mean square error can be appended to the two least significant bits of the position error signal. A high quality real random number generator in accordance with the present invention that combines bits from the position error signal and the mean square error in the disk drive channel can provide around 500 kb/s.

Figure 8:
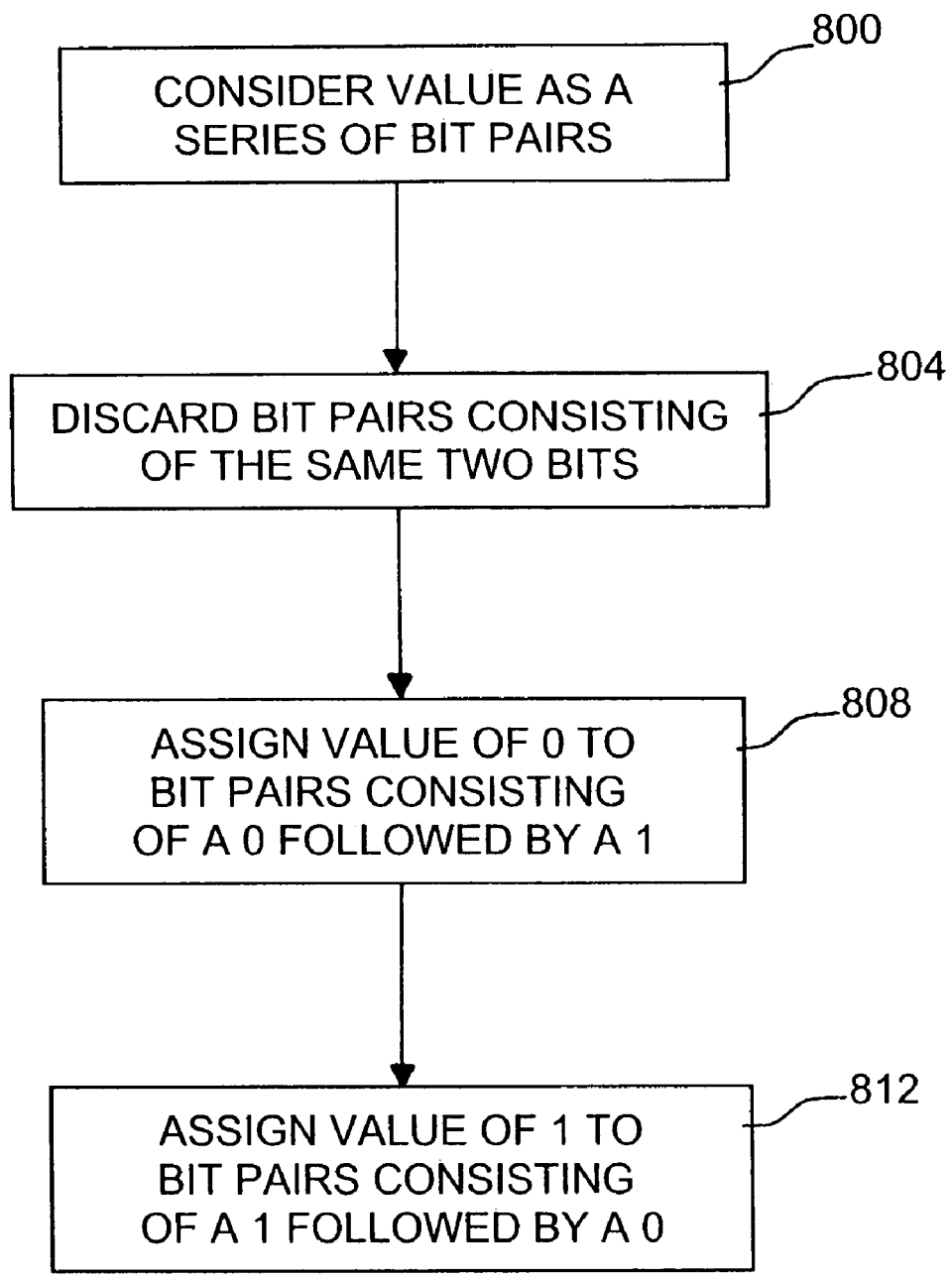
FIG. 8 is a flowchart illustrating the filtering of random values according to an embodiment of the present invention.

FIG. 8 illustrates the application of a filtering technique in accordance with one embodiment of the present invention. In general, the filtering of values before they are provided as high quality real random numbers to an application is considered beneficial in order to eliminate bias. One method of filtering the values is to apply a von Neumann filter. The von Neumann filter considers a given bit stream as a series of non-overlapping bit pairs. Pairs consisting of "00" or "11" are discarded, "01" is interpreted as "0", and "10" is interpreted as "1". Of course, the patterns of bit pairs that are discarded and that are interpreted as either a "0" or a "1" may be varied.

At step 800 the input value is considered as a series of bit pairs. For instance, where the value is "11011000", the value would be considered as a first pair "11," a second pair "01," a third pair "10" and a fourth pair "00." All bit pairs that consist of the same two bits are discarded (step 804). Therefore, according to the example given above, the first (11) and fourth (00) pairs are discarded. Next, a value of zero is assigned to bit pairs consisting of a zero followed by a one (step 808). According to the example given above, the second pair (01) is assigned a value of zero. A value of one is assigned to bit pairs consisting of a one followed by a zero (step 812). Therefore, in the above example, the third pair (10) is assigned a value of one. Accordingly, following the filtering of the example value of 11011000, a value "01" remains.

Filtering may also be accomplished by performing a frequency analysis of the raw or mixed values before they are provided to an application as high quality real random numbers. For instance, a Fourier transform of the values can be taken and commonly occurring values can be filtered out. The remaining values will therefore be more uniformly distributed.

In order to implement the present invention, suitable programming may be provided in the controller 132 as a part of the firmware of the disk drive 100. In general, no changes to the controller 132 or other disk drive circuitry is necessary in order to implement the invention. However, where filtering of values obtained from disk drive parameters involves the use of a Fourier transform, it may be desirable to provide a controller 132 having a relatively powerful microprocessor. Accordingly, a less computationally intense filtering method, such as one employing the von Neumann method as described above, is desirable for use in connection with a standard disk drive controller 132.

High quality real random numbers generated according to the present invention may be provided to the host computer as those numbers become available. Alternatively, high quality real random numbers may be stored on the disk 108 for later use. For example, the disk drive 100 may be operated to generate high quality real random numbers while the disk drive is otherwise idle, and those numbers may be stored to the disk 108. In this way, a large store of high quality real random numbers may be available for use by applications running on the host computer, without requiring that the application running on the host computer wait while high quality real random numbers are generated. According to one embodiment of the present invention, 1,000 high quality real random bits are generated each second. Therefore, a disk drive 100 in accordance with one embodiment of the present invention may provide at least 1,000 random bits per second in response to a request from an application. According to another embodiment of the present invention, at least 25,000 random bits may be generated each second. According to still another embodiment of the present invention, 100,000 random bits are generated each second. According to an embodiment of the present invention which provides for the generation and storage of high quality real random numbers while the disk drive 100 is otherwise idle, a large cache of random bits may be stored on the disk 108 for immediate access by the application program. According to one embodiment of the present invention, several Megabytes of random bits are stored on the disk 108 for later use. However, for special applications, the entire drive could be filled with random high quality real numbers.

The following example is provided for purposes of illustration only and is not intended to limit the scope of the invention. This example illustrates the number of real random bits that may be generated by monitoring a position error signal in a hard disk drive operating at 5400 rpm, having 180 servo sectors per revolution and a servo burst frequency of 64,800.

EXAMPLE

| Number of Least | Random Bits | Random Bits Produced With |
|---|---|---|
| 1 | 64800 | 16200 |
| 2 | 129600 | 32400 |
| 3 | 194400 | 48600 |
| 4 | 259200 | 64800 |
| 5 | 324000 | 81000 |
| 6 | 388800 | 97200 |
| 7 | 453600 | 113400 |
| 8 | 518400 | 129600 |

According to the present invention, a method and apparatus for generating high quality real random numbers are disclosed. In particular, the present invention provides a system for generating high quality real random numbers that does not require the addition of hardware not normally associated with a computer. More particularly, the present invention enables a common hard disk drive to function as a high quality real random number generator.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments to the extent permitted by the prior art.

What is claimed is:

1. A method for generating high quality real random numbers using a disk drive, comprising:
    monitoring a first position error signal derived from a first servo sector position burst associated with a first track and located in a first servo sector; and
    obtaining a random number from said first position error signal.

2. The method of claim 1, further comprising monitoring a second position error signal derived from a second servo sector position burst associated with said first track and located within said first servo sector, wherein said obtaining comprises combining said first and second position error signals.

3. The method of claim 2, further comprising:
    monitoring a third position error signal derived from a third servo sector position burst associated with said first track and located within said first servo sector; and
    monitoring a fourth position error signal derived from a fourth servo sector position burst associated with said first track and located within said first servo sector, wherein said obtaining comprises combining said first, second, third and fourth position error signals.

4. The method of claim 3, wherein said first, second, third and fourth servo sector position bursts are A, B, C and D servo sector position bursts.

5. The method of claim 1, wherein said first servo sector position burst is an A servo sector position burst.

6. The method of claim 1, wherein said obtaining a comprises filtering a numerical representation of said first signal.

7. The method of claim 1, further comprising:
    moving a transducer head of said disk drive to a second track;
    monitoring a second position error signal derived from a first servo sector position burst associated with said second track; and
    obtaining an additional random number from said second position error signal.

8. The method of claim 7, wherein said second track is randomly selected.

9. The method of claim 7, wherein said second track is pseudo-randomly selected.

10. The method of claim 1, further comprising:
    moving a transducer head of said disk drive to a randomly selected Nth track;
    monitoring an Nth position error signal derived from a first servo sector position burst associated with said Nth track; and
    obtaining a first additional random number from said Nth position error signal.

11. The method of claim 10, wherein said Nth track is randomly selected.

12. The method of claim 10, wherein said Nth track is pseudo-randomly selected.

13. The method of claim 10, further comprising:
    monitoring an Mth position error signal derived from a first servo sector position burst associated with said Nth track and located within an Mth servo sector; and
    obtaining a second additional random number from said Mth position error signal.

14. The method of claim 1, wherein at least 1,000 random numbers are generated per second.

15. The method of claim 1, wherein at least 25,000 random numbers are generated per second.

16. The method of claim 1, further comprising providing said random number to a host computer.

17. The method of claim 1, further comprising storing said random number in said disk drive.

18. The method of claim 17, further comprising, in response to a request from a host computer, providing said stored random number to said host computer.

19. The method of claim 1, further comprising:
    monitoring a second position error signal derived from a first servo sector position burst associated with said first track and located in a second servo sector; and
    obtaining an additional random number from said second position error signal.

20. The method of claim 1, further comprising:
    monitoring an Mth position error signal derived from a first servo sector position burst associated with said first track and located in an Mth servo sector; and
    obtaining an additional random number from said Mth position error signal.

21. The method of claim 20, further comprising repeating said monitoring an Mth position error signal and obtaining an additional random number from said Mth position error signal M times, wherein M is less than a total number of servo sectors associated with said first track.

22. The method of claim 1, further comprising performing said method while said disk drive is otherwise idle.

23. The method of claim 1, wherein said obtaining comprises:
    converting said first position error signal to a numerical value; and discarding all but the two least significant digits of said numerical value.

24. A method for generating high quality real random numbers using a disk drive, comprising:
monitoring a first position error signal derived from a first servo sector position burst associated with a first track and located in a first servo sector;
monitoring a second position error signal derived from a second servo sector position burst associated with said first track and located within said first servo sector;
monitoring a third position error signal derived from a third servo sector position burst associated with said first track and located within said first servo sector;
monitoring a fourth position error signal derived from a fourth servo sector position burst associated with said first track and located within said first servo sector;
converting said first, second, third and fourth position error signals to first, second, third and fourth numerical values;
adding said first numerical value to said second numerical value to obtain a first sum;
subtracting from the negative of said third numerical value said fourth numerical value to obtain a second sum; and
computing the Exclusive Or of a binary form of said first sum and a binary form of said second sum to obtain a random number.

25. A method for generating high quality real random numbers in a disk drive, comprising:
monitoring a first position error signal derived from a first servo sector position burst associated with a first track and located in a first servo sector; and
filtering a numerical representation of said first signal to obtain a random number,
wherein said filtering comprises:
decomposing said numerical representation into pairs of binary digits;
disregarding a binary digit pair having the same two digits;
converting a binary digit pair having a first combination of first and second digits to a first digit; and
converting a binary digit pair having a second combination of first and second digits to a second digit.

26. A method for generating high quality real random numbers using a disk drive having a digital channel, comprising:
monitoring a quality monitor of said digital channel; and
obtaining a random number from said monitoring.

27. The method of claim 26, wherein an output of said quality monitor is a channel parameter of said disk drive.

28. The method of claim 26, wherein said random numbers are generated at a rate sufficient to provide random bits to an application program, and no delay is perceived by a user of said application program as a result of said generation of random bits.

29. The method of claim 26, wherein at least 1,000 random bits are provided per second.

30. The method of claim 26, wherein at least 25,000 random bits are provided per second.

31. The method of claim 26, wherein at least 100,000 random bits are provided per second.

32. The method of claim 26, wherein said random numbers are stored on a disk of said disk drive, and said stored random numbers are read from said disk drive and provided to an application program.

33. The method of claim 26, further comprising obtaining a first signal from said quality monitor during a first time period.

34. The method of claim 33 wherein said obtaining a random number comprises filtering a numerical representation of said first signal.

35. The method of claim 34, wherein said filtering comprises:
decomposing said numerical representation into pairs of binary digits;
disregarding a binary digit pair having the same two digits;
converting a binary digit pair having a first combination of first and second digits to a first digit; and
converting a binary digit pair having a second combination of first and second digits to a second digit.

36. The method of claim 34, wherein said filtering comprises:
converting said numerical representation to a binary numerical value;
considering said binary numerical value as a series of digit pairs;
discarding digit pairs having the same two digits;
treating a first binary digit pair composed of different digits in a first order as a 0; and
treating a second binary digit pair composed of different digits in a second order as a 1.

37. The method of claim 33, wherein said monitoring includes obtaining a second signal from said quality monitor during a second time period.

38. The method of claim 37, further comprising combining said first and second signals to obtain said random number.

39. The method of claim 38 wherein said combining comprises:
converting said first, second, third and fourth signals to first, second, third and fourth numerical values;
adding said first numerical value to said second numerical value to obtain a first sum;
subtracting from the negative of said third numerical value said fourth numerical value to obtain a second sum; and
computing the Exclusive Or of a binary form of said first sum and a binary form of said second sum to obtain said random number.

40. The method of claim 37, further comprising:
obtaining third and fourth signals from said quality monitor during third and fourth time periods; and
combining said first, second, third and fourth signals to obtain said random number.

41. The method of claim 26, wherein an output of said quality monitor corresponds to a numerical value and said random number is obtained by discarding all but a predetermined number of the least significant digits of said numerical value.

42. The method of claim 41, wherein said predetermined number is two.

43. The method of claim 26 wherein said method is performed while said disk drive is otherwise idle.

44. The method of claim 26, wherein said random number is provided to a host computer.

45. The method of claim 26, wherein said random number is stored on a disk.

46. The method of claim 45, wherein, in response to a request from a host computer, said stored random number is provided to said host computer.

47. A method for generating random numbers using a disk drive, comprising:
monitoring at least one of a servo sector position error signal and a channel parameter other than a servo sector position error signal to obtain a first random value; and
deriving a random number from said first random value.

48. The method of claim 47, further comprising:
monitoring at least one of a servo sector position error signal and a channel parameter other than a servo sector position error signal to obtain a second random value; and
deriving a second random number from said second random value.

49. The method of claim 48, wherein said first random value is obtained by monitoring a source that is different from a source of said second random value.

50. The method of claim 47, further comprising:
monitoring at least one of a servo sector position error signal and a channel parameter other than a servo sector position error signal to obtain an Nth random value; and
deriving an additional random number from said Nth random value.

51. The method of claim 47, further comprising:
moving a transducer head to a selected track;
monitoring at least one of a servo sector position error signal and a channel parameter other than a servo sector position error signal to obtain an additional random value; and
deriving an additional random number from said additional random value.

52. The method of claim 51, wherein said selected track is randomly selected.

53. The method of claim 51, wherein said selected track is pseudo-randomly selected.

54. The method of claim 47, wherein said deriving comprises filtering said first random value.

55. The method of claim 47, wherein said channel parameter comprises at least one of a flying height of a transducer head over a disk, a gain in a channel, a temperature of said disk drive, an amplitude of a data signal derived from a disk, electronic noise and a quality monitor of a channel.

56. A method for generating random numbers using a disk drive, comprising:
monitoring a servo sector position error signal to obtain a random value; and
filtering said random value to derive,
wherein said filtering comprises:
converting said random value to a binary numerical value;
considering said binary numerical value as a series of digit pairs;
discarding digit pairs having the same two digits;
treating a first binary digit pair composed of different digits in a first order as a 0; and
treating a second binary digit pair composed of different digits in a second order as a 1.

57. A disk drive, comprising:
a base;
a disk comprising data tracks arranged concentrically about a spindle, wherein each of said data tracks is segmented into data sectors by servo sectors, and said disk is rotatable with respect to said base;
a transducer head that, is movable in a radial direction with respect to said disk to address a selected one of said data tracks;
a voice coil motor, interconnected to said transducer head, for moving said transducer head with respect to said data tracks; and
a controller, interconnected to said voice coil motor, for controlling a position of said transducer head with respect to said data tracks, wherein said controller receives position error information from a first servo sector position burst located in a first servo sector concerning a position of said transducer head with respect to a first track being followed by said transducer head, and a random number is obtained from said position error information.

58. The disk drive of claim 57, wherein said controller receives position error information from a second servo sector position burst located in said first servo sector concerning a position of said transducer head with respect to said first track, and said random number is obtained by combining said position error information from said first and second servo sector position bursts.

59. The disk drive of claim 58, wherein said controller receives position error information from third and fourth servo sector position bursts located in said first servo sector concerning a position of said transducer head with respect to said first track, and said random number is obtained by combining said position error information from said first, second, third and fourth servo sector position bursts.

60. The disk drive of claim 59, wherein said first, second, third and fourth servo sector position bursts are A, B, C and D servo sector position bursts.

61. The disk drive of claim 57, wherein said first servo sector position burst is an A servo sector position burst.

62. The disk drive of claim 57, wherein said position error information is filtered to obtain said random number.

63. The disk drive of claim 57, wherein said controller controls said voice coil motor to move said transducer head to a second track, said controller receives position error information from a first servo sector position burst located in a first servo sector concerning a position of said transducer head with respect to said second track, and an additional random number is derived from said position error information concerning a position of said transducer head with respect to said second track.

64. The disk drive of claim 63, wherein said second track is randomly selected.

65. The disk drive of claim 63, wherein said second track is pseudo-randomly selected.

66. The disk drive of claim 57, wherein said controller controls said voice coil motor to move said transducer head to an Nth track, said controller receives position error information from a first servo sector position burst located in a first servo sector concerning a position of said transducer head with respect to said Nth track, and an additional random number is derived from said position error information concerning a position of said transducer head with respect to said Nth track.

67. The disk drive of claim 66, wherein said Nth track is randomly selected.

68. The disk drive of claim 48, wherein said Nth track is pseudo-randomly selected.

69. The disk drive of claim 66, wherein an additional random number is derived from position error information received by said controller from a first servo sector position burst located within an Mth servo sector of said Nth track.

70. The disk drive of claim 69, wherein said controller continues to move said transducer head to an Nth track and receives position error information from a first servo sector position burst located in M servo sectors concerning a position of said transducer head with respect to said Nth track being followed by said transducer head to obtain an additional random number until a required number of random numbers have been derived.

71. The disk drive of claim 57, wherein at least 1,000 random numbers are generated per second.

72. The disk drive of claim 57, wherein at least 25,000 random numbers are generated per second.

73. The disk drive of claim 57, wherein said random number is provided to a host computer.

74. The disk drive of claim 57, wherein said random number is stored on said disk.

75. The disk drive of claim 74, wherein in response to a request from a host computer said stored random number is provided to said host computer.

76. The disk drive of claim 57, wherein said controller receives position error information from a first servo sector position burst located in a second servo sector concerning a position of said transducer head with respect to said first track, and an additional random number is derived from said position error information from said first servo sector position burst located in said second servo sector.

77. The disk drive of claim 57, wherein said controller receives position error information from a servo sector position burst located in an Mth servo sector concerning a position of said transducer head with respect to said first track being followed by said transducer head, and an additional random number is derived from said position error information from said first servo sector position burst located in said Mth servo sector.

78. The disk drive of claim 77, wherein M is less than a total number of servo sectors traversed by said transducer head in a single revolution of said disk.

79. The drive of claim 57, wherein an additional random number is obtained from at least one of a flying height of said transducer head over said disk, gain in a channel, a temperature of said disk drive, an amplitude of a data signal derived from said disk, electronic noise and a quality monitor for a channel.

80. The disk drive of claim 57, wherein said position error information is a numerical value and said random number is obtained by discarding all but the two least significant digits of said numerical value.

81. A disk drive, comprising:
a base;
a disk comprising data tracks arranged concentrically about a spindle, wherein each of said data tracks is segmented into data sectors by servo sectors, and wherein said disk is rotatable with respect to said base;
a transducer head that, wherein said transducer head is movable in a radial direction with respect to said disk to address a selected one of said data tracks;
a voice coil motor, interconnected to said transducer head, for moving said transducer head with respect to said data tracks; and
a controller, interconnected to said voice coil motor, for controlling a position of said transducer head with respect to said data tracks, wherein said controller receives position error information from first, second, third and fourth servo sector position bursts located in a first servo sector concerning a position of said transducer head with respect to a first track being followed by said transducer head, and a
random number is obtained by converting said position error information from said first, second, third and fourth servo sector position bursts to first, second, third and fourth numerical values, adding said first numerical value to said second numerical value to obtain a first sum, subtracting from the negative of said third numerical value said fourth numerical value to obtain a second sum, and computing the Exclusive Or of a binary form of said first sum and a binary form of said second sum.

82. A disk drive, comprising:
a base;
a disk comprising data tracks arranged concentrically about a spindle, wherein each of said data tracks is segmented into data sectors by servo sectors, and said disk is rotatable with respect to said base;
a transducer head that is movable in a radial direction with respect to said disk to address a selected one of said data tracks;
a voice coil motor, interconnected to said transducer head, for moving said transducer head with respect to said data tracks; and
a controller, interconnected to said voice coil motor, for controlling a position of said transducer head with respect to said data tracks, wherein said controller receives position error information from a first servo sector position burst located in a first servo sector concerning a position of said transducer head with respect to a first track being followed by said transducer head,
said position error information is filtered to obtain a random number, and
said filtering comprises decomposing a numerical representation of said position error information into pairs of binary digits, disregarding a binary digit pair having the same two digits, converting a binary digit pair having a first combination of first and second digits to a first digit, and converting a binary digit pair having a second combination of first and second digits to a second digit.

83. A method for generating random numbers in a disk drive, comprising:
monitoring a parameter of said disk drive, wherein said parameter is selected from the group consisting of a position error of a transducer head with respect to a disk, a flying height of a transducer head over a disk, a gain in a channel, a temperature of said disk drive, an amplitude of a data signal derived from a disk, electronic noise and a quality monitor for a channel, and said parameter is subjected to at least one of an environmental condition and noise; and
generating said random numbers at a rate sufficient to provide random bits to an application program, wherein no delay is perceived by a user of said application program as a result of said generation of random bits.

84. The method of claim 83, wherein at least 1,000 random bits are provided per second.

85. The method of claim 83, wherein at least 25,000 random bits are provided per second.

86. The method of claim 83, wherein at least 100,000 random bits are provided per second.

87. The method of claim 83, wherein said environmental condition is random and said parameter is influenced by said environmental condition.

88. The method of claim 83, wherein said random numbers are stored in said disk drive, and said stored random numbers are read from said disk drive and provided to said application program.

89. A method for generating random numbers using a disk drive, comprising:
monitoring a channel parameter other than a servo sector position error signal to obtain random value; and filtering said random value to derive a random number, wherein said filtering comprises:
  converting said random value to a binary numerical value;
  considering said binary numerical value as a series of digit pairs;
  discarding digit pairs having the same two digits;
  treating a first binary digit pair composed of different digits in a first order as a 0; and
  treating a second binary digit pair composed of different digits in a second order as a 1.

90. A disk drive, comprising:
  a disk having data tracks arranged concentrically about a spindle, wherein said disk is rotatable;
  transducer head that is movable in a radial direction with respect to said disk to address a selected one of said data tracks;
  a motor, interconnected to said transducer head, which moves said transducer head with respect to said data tracks;
  a digital channel; and
  circuitry configured to
  provide a first signal of a quality monitor and
  obtain a random number based on said first signal.

91. The disk drive of claim 90, wherein an output of said quality monitor is a channel parameter of said disk drive.

92. The disk drive of claim 90, wherein random numbers are generated at a rate sufficient to provide random bits to an application program, and no delay is perceived by a user of said application program as a result of said generation of random bits.

93. The disk drive of claim 90, wherein at least 1,000 random bits are provided per second.

94. The disk drive of claim 90, wherein at least 25,000 random bits are provided per second.

95. The disk drive of claim 90, wherein at least 100,000 random bits are provided per second.

96. The disk drive of claim 90, wherein random numbers are stored in said disk drive, and said stored random numbers are read from said disk drive and provided to an application program.

97. The disk drive of claim 90, wherein said circuitry is configured to obtain said first signal from said quality monitor during a first time period.

98. The disk drive of claim 97, wherein said circuitry is configured to filter a numerical representation of said first signal.

99. The disk drive of claim 98, wherein said circuitry is configured to:
  decompose said numerical representation into pairs of binary digits;
  disregard a binary digit pair having the same two digits;
  convert a binary digit pair having a first combination of first and second digits to a first digit; and
  convert a binary digit pair having a second combination of first and second digits to a second digit.

100. The disk drive of claim 98, wherein said circuitry is configured to:
  convert said numerical representation to a binary numerical value;
  consider said binary numerical value as a series of digit pairs;
  discard digit pairs having the same two digits;
  treat a first binary digit pair composed of different digits in a first order as a 0; and
  treat a second binary digit pair composed of different digits in a second order as a 1.

101. The disk drive of claim 97, wherein said circuitry is configured to
  obtain a second signal from said quality monitor during a second time period.

102. The disk drive of claim 101, wherein said circuitry is configured to
  combine said first and second signals obtained to obtain said random number.

103. The disk drive of claim 101, wherein said circuitry is configured to:
  obtain third and fourth signals from said quality monitor during third and fourth time periods; and
  combine said first, second, third and fourth signals to obtain said random number.

104. The disk drive of claim 103, wherein said circuitry is configured to:
  convert said first, second, third and fourth signals to first, second, third and fourth numerical values;
  add said first numerical value to said second numerical value to obtain a first sum;
  subtracting from the negative of said third numerical value said fourth numerical value to obtain a second sum; and
  compute the Exclusive Or of a binary form of said first sum and a binary form of said second sum to obtain said random number.

105. The disk drive of claim 90, wherein an output of said quality monitor corresponds to a numerical value and said circuitry is configured to discard all but a predetermined number of the least significant digits of said numerical value.

106. The disk drive of claim 105, wherein said predetermined number is two.

107. The disk drive of claim 90, wherein said random number is provided to a host computer.

108. The disk drive of claim 90, wherein said random number is stored on said disk.

109. The disk drive of claim 108, wherein said circuitry is configured to provide said stored random number to a host computer, in response to a request from said host computer.

110. A disk drive for generating high quality real random numbers, comprising:
  a digital channel;
  a quality monitor that monitors said channel;
  means for monitoring said quality monitor; and
  means for obtaining a random number from said monitoring mean.

111. The disk drive of claim 110, wherein random numbers are generated at a rate sufficient to provide random bits to an application program, and no delay is perceived by a user of said application program as a result of said generation of random bits.

112. The disk drive of claim 110, wherein at least 1,000 random bits are provided per second.

113. The disk drive of claim 110, wherein at least 25,000 random bits are provided per second.

114. The disk drive of claim 110, wherein at least 100,000 random bits are provided per second.

115. The disk drive of claim 110, wherein said random number is stored on a disk of said disk drive, and said stored random number is read from said disk drive and provided to an application program.

116. The disk drive of claim 110, further comprising means for obtaining a first signal from said quality monitor during a first time period.

117. The disk drive of claim 116, further comprising means for filtering a numerical representation of said first signal.

118. The disk drive of claim 117, further comprising:
- means for decomposing said numerical representation into pairs of binary digits;
- means for disregarding a binary digit pair having the same two digits;
- means for converting a binary digit pair having a first combination of first and second digits to a first digit; and
- means for converting a binary digit pair having a second combination of first and second digits to a second digit.

119. The disk drive of claim 117, wherein said filtering means comprises:
- means for converting said numerical representation to a binary numerical value;
- means for considering said binary numerical value as a series of digit pairs;
- means for discarding digit pairs having the same two digits;
- means for treating a first binary digit pair composed of different digits in a first order as a 0; and
- means for treating a second binary digit pair composed of different digits in a second order as a 1.

120. The disk drive of claim 116, further comprising means for obtaining a second signal from said quality monitor during a second time period.

121. The disk drive of claim 120, further comprising means for combining said first and second signals to obtain said random number.

122. The disk drive of claim 121, further comprising:
- means for converting said first, second, third and fourth signals to first, second, third and fourth numerical values;
- means for adding said first numerical value to said second numerical value to obtain a first sum;
- means for subtracting from the negative of said third numerical value said fourth numerical value to obtain a second sum; and
- means for computing the Exclusive Or of a binary form of said first sum and a binary form of said second sum to obtain said random number.

123. The disk drive of claim 120, further comprising:
- means for obtaining third and fourth signals from said quality monitor during third and fourth time periods; and
- means for combining said first, second, third and fourth signals to obtain said random number.

124. The disk drive of claim 110, wherein an output of said quality monitor corresponds to a numerical value and further comprising means for discarding all but a predetermined number of the least significant digits of said numerical value.

125. The disk drive of claim 124, wherein said predetermined number is two.

126. The disk drive of claim 110, wherein said random number is provided to a host computer.

127. The disk drive of claim 110, wherein said random number is stored on said disk.

128. The disk drive of claim 127, wherein, in response to a request from a host computer, said stored random number is provided to said host computer.

129. The disk drive of claim 110, wherein at least one of said monitoring means and said obtaining means comprises a microprocessor.

130. A method for generating high quality real random numbers using a disk drive, comprising:
- monitoring a flying height of a transducer head over a disk; and
- obtaining a random number from said monitoring.

131. The method of claim 130, wherein said flying height is a channel parameter of said disk drive.

132. The method of claim 130, wherein random numbers are generated at a rate sufficient to provide random bits to an application program, and no delay is perceived by a user of said application program as a result of said generation of random bits.

133. The method of claim 130, wherein at least 25,000 random bits are provided per second.

134. The method of claim 130, wherein random numbers are stored in said disk drive, and said stored random numbers are read from said disk drive and provided to an application program.

135. The method of claim 130, further comprising:
- obtaining a first signal indicative of said flying height during a first time period;
- providing a numerical representation of said first signal;
- decomposing said numerical representation into pairs of binary digits;
- disregarding a binary digit pair having the same two digits;
- converting a binary digit pair having a first combination of first and second digits to a first digit; and
- converting a binary digit pair having a second combination of first and second digits to a second digit.

136. The method of claim 130, further comprising:
- obtaining first, second, third and fourth signals indicative of said flying height during first, second, third and fourth time periods;
- converting said first, second, third and fourth signals to first, second, third and fourth numerical values;
- adding said first numerical value to said second numerical value to obtain a first sum;
- subtracting from the negative of said third numerical value said fourth numerical value to obtain a second sum; and
- computing the Exclusive Or of a binary form of said first sum and a binary form of said second sum to obtain said random number.

137. The method of claim 130, further comprising:
- converting said flying height to a binary numerical value;
- considering said binary numerical value as a series of digit pairs;
- discarding digit pairs having the same two digits;
- treating a first binary digit pair composed of different digits in a first order as a 0; and
- treating a second binary digit pair composed of different digits in a second order as a 1.

138. A method for generating high quality real random numbers using a disk drive, comprising:
- monitoring a gain in a channel; and
- obtaining a random number from said monitoring.

139. The method of claim 138, wherein said gain is a channel parameter of said disk drive.

140. The method of claim 138, wherein random numbers are generated at a rate sufficient to provide random bits to an application program, and no delay is perceived by a user of said application program as a result of said generation of random bits.

141. The method of claim 138, wherein at least 25,000 random bits are provided per second.

142. The method of claim 138, wherein random numbers are stored in said disk drive, and said stored random numbers are read from said disk drive and provided to an application program.

143. The method of claim 138, further comprising:
obtaining a first signal indicative of said gain during a first time period;
providing a numerical representation of said first signal;
decomposing said numerical representation into pairs of binary digits;
disregarding a binary digit pair having the same two digits;
converting a binary digit pair having a first combination of first and second digits to a first digit; and
converting a binary digit pair having a second combination of first and second digits to a second digit.

144. The method of claim 138, further comprising:
obtaining first, second, third and fourth signals indicative of said gain during first, second, third and fourth time periods;
converting said first, second, third and fourth signals to first, second, third and fourth numerical values;
adding said first numerical value to said second numerical value to obtain a first sum;
subtracting from the negative of said third numerical value said fourth numerical value to obtain a second sum; and
computing the Exclusive Or of a binary form of said first sum and a binary form of said second sum to obtain said random number.

145. The method of claim 138, further comprising:
converting said gain to a binary numerical value;
considering said binary numerical value as a series of digit pairs;
discarding digit pairs having the same two digits;
treating a first binary digit pair composed of different digits in a first order as a 0; and
treating a second binary digit pair composed of different digits in a second order as a 1.

146. A method for generating high quality real random numbers using a disk drive, comprising:
monitoring an amplitude of a data signal derived from a disk; and
obtaining a random number from said monitoring.

147. The method of claim 146, wherein said amplitude is a channel parameter of said disk drive.

148. The method of claim 146, wherein random numbers are generated at a rate sufficient to provide random bits to an application program, and no delay is perceived by a user of said application program as a result of said generation of random bits.

149. The method of claim 146, wherein at least 25,000 random bits are provided per second.

150. The method of claim 146, wherein random numbers are stored in said disk drive, and said stored random numbers are read from said disk drive and provided to an application program.

151. The method of claim 146, wherein said data signal is derived from magnetic transitions stored on said.

152. The method of claim 146, further comprising:
obtaining a first signal indicative of said amplitude during a first time period;
providing a numerical representation of said first signal;
decomposing said numerical representation into pairs of binary digits;
disregarding a binary digit pair having the same two digits;
converting a binary digit pair having a first combination of first and second digits to a first digit; and
converting a binary digit pair having a second combination of first and second digits to a second digit.

153. The method of claim 146, further comprising:
obtaining first, second, third and fourth signals indicative of said amplitude during first, second, third and fourth time periods;
converting said first, second, third and fourth signals to first, second, third and fourth numerical values;
adding said first numerical value to said second numerical value to obtain a first sum;
subtracting from the negative of said third numerical value said fourth numerical value to obtain a second sum; and
computing the Exclusive Or of a binary form of said first sum and a binary form of said second sum to obtain said random number.

154. The method of claim 146, further comprising:
converting said amplitude to a binary numerical value;
considering said binary numerical value as a series of digit pairs;
discarding digit pairs having the same two digits;
treating a first binary digit pair composed of different digits in a first order as a 0; and
treating a second binary digit pair composed of different digits in a second order as a 1.

155. A method for generating high quality real random numbers using a disk drive, comprising:
monitoring electronic noise; and
obtaining a random number from said monitoring.

156. The method of claim 155, wherein said electronic noise is a channel parameter of said disk drive.

157. The method of claim 155, wherein random numbers are generated at a rate sufficient to provide random bits to an application program, and no delay is perceived by a user of said application program as a result of said generation of random bits.

158. The method of claim 155, wherein at least 25,000 random bits are provided per second.

159. The method of claim 155, wherein random numbers are stored in said disk drive, and said stored random numbers are read from said disk drive and provided to an application program.

160. The method of claim 155, further comprising:
obtaining a first signal indicative of said electronic noise during a first time period;
providing a numerical representation of said first signal;
decomposing said numerical representation into pairs of binary digits;
disregarding a binary digit pair having the same two digits;
converting a binary digit pair having a first combination of first and second digits to a first digit; and
converting a binary digit pair having a second combination of first and second digits to a second digit.

161. The method of claim 155, further comprising:
obtaining first, second, third and fourth signals indicative of said electronic noise during first, second, third and fourth time periods;
converting said first, second, third and fourth signals to first, second, third and fourth numerical values;
adding said first numerical value to said second numerical value to obtain a first sum;
subtracting from the negative of said third numerical value said fourth numerical value to obtain a second sum; and computing the Exclusive Or of a binary form of said first sum and a binary form of said second sum to obtain said random number.

162. The method of claim 155, further comprising:
converting said electronic noise to a binary numerical value;
considering said binary numerical value as a series of digit pairs;
discarding digit pairs having the same two digits;
treating a first binary digit pair composed of different digits in a first order as a 0; and
treating a second binary digit pair composed of different digits in a second order as a 1.

163. A method for generating high quality real random numbers using a disk drive, comprising:
monitoring a temperature of said disk drive; and
obtaining a random number from said monitoring.

164. The method of claim 163, wherein random numbers are generated at a rate sufficient to provide random bits to an application program, and no delay is perceived by a user of said application program as a result of said generation of random bits.

165. The method of claim 163, wherein at least 25,000 random bits are provided per second.

166. The method of claim 163, wherein random numbers are stored in said disk drive, and said stored random numbers are read from said disk drive and provided to an application program.

167. The method of claim 163, further comprising:
obtaining a first signal indicative of said temperature during a first time period;
providing a numerical representation of said first signal;
decomposing said numerical representation into pairs of binary digits;
disregarding a binary digit pair having the same two digits;
converting a binary digit pair having a first combination of first and second digits to a first digit; and
converting a binary digit pair having a second combination of first and second digits to a second digit.

168. The method of claim 163, further comprising:
obtaining first, second, third and fourth signals indicative of said temperature during first, second, third and fourth time periods;
converting said first, second, third and fourth signals to first, second, third and fourth numerical values;
adding said first numerical value to said second numerical value to obtain a first sum;
subtracting from the negative of said third numerical value said fourth numerical value to obtain a second sum; and
computing the Exclusive Or of a binary form of said first sum and a binary form of said second sum to obtain said random number.

169. The method of claim 163, further comprising:
converting said temperature to a binary numerical value;
considering said binary numerical value as a series of digit pairs;
discarding digit pairs having the same two digits;
treating a first binary digit pair composed of different digits in a first order as a 0; and
treating a second binary digit pair composed of different digits in a second order as a 1.

170. The method of claim 163, wherein said method is performed while said disk drive is otherwise idle.

171. A method for generating random numbers using a disk drive, comprising:
monitoring a parameter of said disk drive, wherein said parameter is selected from the group consisting of a position error of a transducer head with respect to a disk, a flying height of a transducer head over a disk, a gain in a channel, a temperature of said disk drive, an amplitude of a data signal derived from a disk, electronic noise and a quality monitor for a channel; and
obtaining a random number from said monitoring.

172. The method of claim 171, wherein said parameter is influenced by a random environmental condition.

173. The method of claim 172, wherein said parameter is said position error.

174. The method of claim 172, wherein said parameter is said flying height.

175. The method of claim 172, wherein said parameter is said gain.

176. The method of claim 172, wherein said parameter is said temperature.

177. The method of claim 172, wherein said parameter is said amplitude.

178. The method of claim 172, wherein said parameter is said electronic noise.

179. The method of claim 172, wherein said parameter is said quality monitor.

180. The method of claim 172, wherein said parameter is not said position error.

181. The method of claim 172, wherein said parameter is not said temperature.

182. The method of claim 172, wherein said parameter is not said electronic noise.

183. The method of claim 172, wherein said random environmental condition is selected from the group consisting of temperature, humidity, pressure and vibration.

184. The method of claim 171, further comprising:
monitoring an additional parameter of said disk drive, wherein said additional parameter is selected from the group consisting of a position error of a transducer head with respect to a disk, a flying height of a transducer head over a disk, a gain in a channel, a temperature of said disk drive, an amplitude of a data signal derived from a disk, electronic noise and a quality monitor for a channel; and
obtaining said random number from said monitoring of said parameter and said additional parameter.

185. The method of claim 171, further comprising:
monitoring an additional parameter of said disk drive, wherein said additional parameter is selected from the group consisting of a position error of a transducer head with respect to a disk, a flying height of a transducer head over a disk, a gain in a channel, a temperature of said disk drive, an amplitude of a data signal derived from a disk, electronic noise and a quality monitor for a channel; and
obtaining an additional random number from said monitoring of said additional parameter.

186. The method of claim 171, further comprising repeating said method to obtain a predetermined number of random numbers.

187. The method of claim 171, further comprising repeating said method to obtain at least 1,000 random numbers per second.

188. The method of claim 171, further comprising performing said method in response to a request from a host computer.

189. The method of claim 171, further comprising performing said method in response to a request from said disk drive.

190. The method of claim 171, further comprising performing said method while said disk drive is otherwise idle.

191. A method for generating random numbers using a disk drive, comprising:
monitoring a parameter of said disk drive, wherein said parameter is selected from the group consisting of a flying height of a transducer head over a disk, a gain in a channel, a temperature of said disk drive, an amplitude of a data signal derived from a disk, electronic noise and a quality monitor for a channel, and said parameter is influenced by a random environmental condition selected from the group consisting of temperature, humidity, pressure and vibration; and
obtaining a random number from said monitoring.

192. The method of claim 191, wherein said parameter is said flying height.

193. The method of claim 191, wherein said parameter is said quality monitor.

194. The method of claim 191, further comprising:
monitoring an additional parameter of said disk drive, wherein said additional parameter is selected from the group consisting of a flying height of a transducer head over a disk, a gain in a channel, a temperature of said disk drive, an amplitude of a data signal derived from a disk, electronic noise and a quality monitor for a channel, and said additional parameter is influenced by a random environmental condition selected from the group consisting of temperature, humidity, pressure and vibration; and
obtaining said random number from said monitoring of said parameter and said additional parameter.

195. The method of claim 191, further comprising:
monitoring an additional parameter of said disk drive, wherein said additional parameter is selected from the group consisting of a flying height of a transducer head over a disk, a gain in a channel, a temperature of said disk drive, an amplitude of a data signal derived from a disk, electronic noise and a quality monitor for a channel, and said additional parameter is influenced by a random environmental condition selected from the group consisting of temperature, humidity, pressure and vibration; and
obtaining an additional random number from said monitoring of said additional parameter.

196. The method of claim 191, further comprising repeating said method to obtain a predetermined number of random numbers.

197. The method of claim 191, further comprising repeating said method to obtain at least 1,000 random numbers per second.

198. The method of claim 191, further comprising performing said method in response to a request from a host computer.

199. The method of claim 191, further comprising performing said method in response to a request from said disk drive.

200. The method of claim 191, further comprising performing said method while said disk drive is otherwise idle.

201. A method for generating random numbers using a disk drive, comprising:
monitoring a quality monitor for a channel of said disk drive, wherein said quality monitor represents an error between a detected signal and an expected signal, and said quality monitor is influenced by a random environmental condition selected from the group consisting of temperature, humidity, pressure and vibration; and
obtaining a random number from said monitoring.

202. The method of claim 201, wherein said detected signal is a detected magnetic signal.

203. The method of claim 201, wherein said environmental condition is said temperature.

204. The method of claim 201, further comprising:
monitoring an additional parameter of said disk drive, wherein said additional parameter is selected from the group consisting of a position error of a transducer head with respect to a disk, a flying height of a transducer head over a disk, a gain in said channel, a temperature of said disk drive, an amplitude of a data signal derived from a disk and electronic noise, and said additional parameter is influenced by a random environmental condition selected from the group consisting of temperature, humidity, pressure and vibration; and
obtaining said random number from said monitoring of said parameter and said additional parameter.

205. The method of claim 201, further comprising:
monitoring an additional parameter of said disk drive, wherein said additional parameter is selected from the group consisting of a position error of a transducer head with respect to a disk, a flying height of a transducer head over a disk, a gain in said channel, a temperature of said disk drive, an amplitude of a data signal derived from a disk and electronic noise, and said additional parameter is influenced by a random environmental condition selected from the group consisting of temperature, humidity, pressure and vibration; and
obtaining an additional random number from said monitoring of said additional parameter.

206. The method of claim 201, further comprising repeating said method to obtain a predetermined number of random numbers.

207. The method of claim 201, further comprising repeating said method to obtain at least 1,000 random numbers per second.

208. The method of claim 201, further comprising performing said method in response to a request from a host computer.

209. The method of claim 201, further comprising performing said method in response to a request from said disk drive.

210. The method of claim 201, further comprising performing said method while said disk drive is otherwise idle.

* * * * *